United States Patent [19]

Cheng

[11] Patent Number: 5,661,502
[45] Date of Patent: Aug. 26, 1997

[54] SELF-ADJUSTING DIGITAL FILTER FOR SMOOTHING COMPUTER MOUSE MOVEMENT

[75] Inventor: Xuejiang Cheng, Dallas, Tex.

[73] Assignee: AST Research, Inc., Irvine, Calif.

[21] Appl. No.: 602,967

[22] Filed: Feb. 16, 1996

[51] Int. Cl.$^6$ ................................................... C09G 5/08
[52] U.S. Cl. ........................... 345/145; 345/159; 345/163
[58] Field of Search ................................. 345/145, 146, 345/157, 158, 167, 163, 164, 165, 166; 395/118; 341/22

[56] References Cited

U.S. PATENT DOCUMENTS

| | | | |
|---|---|---|---|
| 5,191,641 | 3/1993 | Yamamoto et al. | 345/159 |
| 5,195,179 | 3/1993 | Tokunaga | 345/145 |
| 5,287,120 | 2/1994 | Okada et al. | 345/163 |
| 5,367,631 | 11/1994 | Levy | 345/163 |
| 5,477,236 | 12/1995 | Nanbu | 345/145 |

*Primary Examiner*—Dennis-Doon Chow
*Attorney, Agent, or Firm*—Haynes and Boone, L.L.P.

[57] ABSTRACT

A self-adjusting digital filter for smoothing computer mouse movement is disclosed. In one embodiment, a user-selectable inertial constant is applied to all types of mouse movements regardless of whether the movement is fast or slow and corrected mouse position data, or coordinates, are computed using the current actual mouse coordinates and the previous corrected mouse coordinates as adjusted by the inertial constant. In an alternative embodiment, a speed sensitive inertial constant, the value of which is dependent upon the values of a user-selectable speed sensitivity constant, the inertial constant, and the speed of the mouse movement, is substituted for the inertial constant such that the amount of filtering that occurs is at least partially dependent on the speed of mouse movement.

22 Claims, 2 Drawing Sheets

SELF-ADJUSTING DIGITAL FILTER FOR SMOOTHING COMPUTER MOUSE MOVEMENT

TECHNICAL FIELD

The invention relates generally to the control of computer input devices and, more particularly, to a self-adjusting digital filter for smoothing the movement of a computer mouse.

BACKGROUND OF THE INVENTION

Graphical user interfaces, or "GUIs" as they are often designated, have become an increasingly common and popular feature of computers, especially personal computers (PCs). One of the many advantages of such GUIs is that they allow a user to enter commands by selecting and manipulating graphical display elements, such as icons, usually with a pointing device, such as a mouse. A mouse is an input device which, when moved over a surface, moves a mouse pointer across the computer display in a corresponding manner. Typically, a mouse has at one to three buttons which when pressed, generate to the computer an input relating the user and the location of the mouse on the computer display. "Clicking" will be used herein to refer to the pressing and releasing of a mouse button, usually the left mouse button, unless otherwise specified. The icons of a GUI are designed to behave in a manner similar to the objects they represent. The Apple Macintosh user interface, Microsoft Windows operating environment, and UNIX X-Windows are common and very popular examples of GUIs, illustrating the fact that the advantages of GUIs over conventional text-based user interfaces are widely recognized.

Clearly, GUIs significantly reduce the amount of information that a user must recall in order effectively to use the computer. For example, instead of having to remember the name of an application program and navigate by manual typing, the user can search files and launch applications in a more intuitive manner, such as by clicking on well organized buttons and icons. As a result of the ever-increasing popularity of GUIs, a variety of different means for organizing and navigating through the various application and other programs have been developed. One such navigational metaphor, hereinafter referred to as "SPOT" or the "SPOT interface," is described in detail in commonly-assigned, cop ending U.S. application Ser. No. 08/431,280, filed Apr. 28, 1995, entitled USER INTERFACE FOR PERSONAL COMPUTER AND THE LIKE, which is hereby incorporated by reference in its entirety.

One of the many unique features of SPOT, as described in the referenced application, is that it is small and unobtrusive. While SPOT's small size provides it with many advantages over previous navigational metaphors, it may be difficult for a user to control the movement of the mouse such that the mouse pointer may be easily positioned directly over SPOT and its associated buttons and other graphical display elements ("GDEs").

Various methods and apparatus currently exist for allowing a user to control certain aspects of computer mouse operation. For example, the Windows interface enables a user to access a mouse dialog box whereby he can adjust the tracking speed, which refers to the speed at which the mouse pointer moves across the display, and double click speed, which refers to the rate at which Windows recognizes double clicks, of the mouse. One feature of the mouse that is not controllable using the Windows GUI is the responsiveness of the mouse pointer displayed on the display to mouse movement. Clearly, such a feature would be beneficial for use in connection with any type of user interface, but would be especially useful in connection with GUI's having small buttons and GDEs, such as the SPOT interface described above. Providing means by which a user can control the responsiveness of the mouse pointer provides him with the capability to prevent, or at reduce the possibility, of overshoot. It will be recognized, therefore, that this feature would be especially beneficial in cases where the user is a small child or an older person, neither of whom typically have the manual dexterity necessary to accurately control a mouse or other input device and hence the position of the pointer on the display.

Therefore, what is needed is a mechanism for enabling the user to control the responsiveness of a mouse, and thereby limit the amount of overshoot that can occur.

SUMMARY OF THE INVENTION

The present invention, accordingly, provides a method and apparatus for smoothing out mouse movement, thereby overcoming or reducing disadvantages and limitations associated with prior methods and systems.

In one embodiment, the invention comprises a digital filter implemented using mathematical model of a low-pass digital filter that employs an inertial constant a to smooth out mouse movement. In this embodiment, a constant inertia is applied to all types of mouse movements regardless of whether the movement is fast or slow and corrected mouse position data, or coordinates, $(x,y)_{corrected}$ are computed using the current mouse coordinates $(X,Y)_{current}$ and the previous corrected mouse coordinates $(x,y)_{previous}$ as adjusted using the inertial constant $\alpha$. In a preferred implementation, the inertial constant $\alpha$ is selectable by the user to enable him to control the amount of filtering to be applied.

An alternative, and presently preferred embodiment, takes advantage of the notion that when a user moves the mouse slowly, he typically wants the movement of the mouse pointer on the display to follow the path of the mouse exactly, whereas when he moves the mouse more quickly, he is typically more concerned with where the pointer ends up than the exact path taken to get there. Additionally, jagged movement caused by the vibration of a user's hand as he moves the mouse is usually caused by a fast movement in that small jagged area. In this alternative embodiment, therefore, a speed sensitive inertial constant β, the value of which is dependent upon the values of a speed sensitivity constant c, the inertial constant $\alpha$, and the speed of the mouse movement s, is substituted for $\alpha$ in the mathematical model described above. In a preferred implementation, the values of both $\alpha$ and c are selectable by the user to enable him to control the amount of filtering to be applied and the speed sensitivity of the filter, respectively.

A technical advantage achieved with the invention is that it can be implemented at the device driver level, such that all computer applications will be affected by the filtering, or at the application level, such that only the particular application(s) into which the filter has been incorporated will be affected by the filtering.

Another technical advantage achieved with the invention is that it can be used with all computers that use a mouse or other input device manipulated manually.

Another technical advantage achieved with the invention is that it only uses one set of previous coordinates, but provides the same performance as filters that use more than one set of previous coordinates.

Yet another technical advantage achieved with the invention is that it is self-adjusting; that is, the filtering process adjusts itself based on the speed of mouse movement.

DETAILED DESCRIPTION OF THE PREFERRED EMBODIMENT

Figure 1:
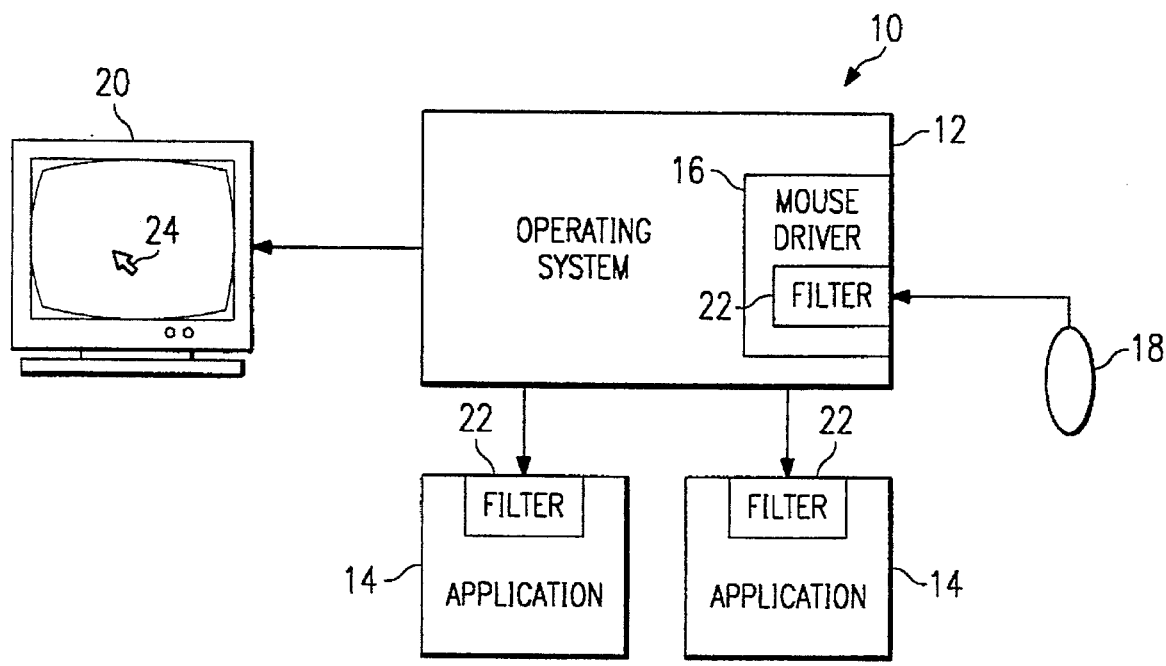
FIG. 1 is system block diagram of a computer embodying features of the present invention.

FIG. 1 illustrates a computer system 10 embodying features of the present invention. Although not shown, it will be recognized that the system 10 comprises appropriate hardware, including, but not limited to, a CPU, memory and mass storage device and various buses, for executing an operating system 12, one or more applications programs 14, and a device driver 16 for handling input from the hardware mouse 18. A display 20, which may be, for example, a CRT or LCD, is also included in the system 10.

As previously indicated, instructions for implementing a self-adjusting digital filter 22 for smoothing mouse movement, as described below with reference to FIG. 2, may be implemented at the driver level, in which case such instructions would be incorporated into the device driver 16, or at the application level, fin which case such instructions would be incorporated into one or more of the applications 14. It will be recognized that if the digital filter 22 of the present invention is implemented at the driver 16 level, all applications executed by the system 10 will be affected by the filtering feature. In contrast, if the digital filter 22 is implemented at the application level, filtering can be enabled and implemented separately for each application 14 that includes the filter 22.

In one embodiment of the invention, a mathematical model of a low pass filter employing an inertial constant $\alpha$ is employed to implement the filter 22. Preferably, a user interface mechanism, such as a dialog box, will be provided for enabling the user to select a desired value for $\alpha$, thereby to control the desired amount of filtering. In particular, the following mathematical model is used:

$$(x,y)_{corrected} = (1-\alpha)(x,y)_{current} + \alpha(x,y)_{previous} \quad (1)$$

where $(x,y)_{current}$ are the corrected mouse coordinates, $(x,y)_{current}$ are the current mouse coordinates before filtering, $(x,y)_{previous}$ are the previous corrected mouse coordinates, and $\alpha$ is a number between 0 and 1.

Although this model will smooth out mouse movement, it applies a constant inertia to all movement without discrimination. Accordingly, the model does not take into account the fact that, typically, when a user is moving mouse 18 slowly, he wants the mouse pointer 24 displayed on the display 20 to exactly follow the path of the mouse 18, whereas when he is moving the mouse 18 more quickly, the less concerned he is with the path of the pointer 24 than with where it ultimately ends up. Additionally, jagged movement caused by the vibration of a user's hand as he manipulates the mouse is typically caused by a fast movement in that small jagged area. Therefore, providing additional filtering when the mouse speed is fast is a good way to suppress this jagged movement.

Accordingly, in an alternative embodiment of the invention, a speed sensitive inertial constant $\beta$, which takes into account the speed at which the mouse 18 is being moved, is employed. In particular:

$$\beta = \alpha(1-e^{-cs}) \quad (2)$$

where c is a sensitivity constant, s quantifies the speed of the movement of the mouse 18, and $\alpha$ is the inertial constant. In the preferred embodiment, both c and $\alpha$ may be set by a user to enable him to select the speed sensitivity of the filter 22 and the amount of filtering provided thereby, respectively.

The following mathematical model is used to implement the digital filter 22 of the alternative embodiment:

$$(x,y)_{corrected} = (1-\beta)(x,y)_{current} + \beta(x,y)_{previous} \quad (3)$$

Figure 2:
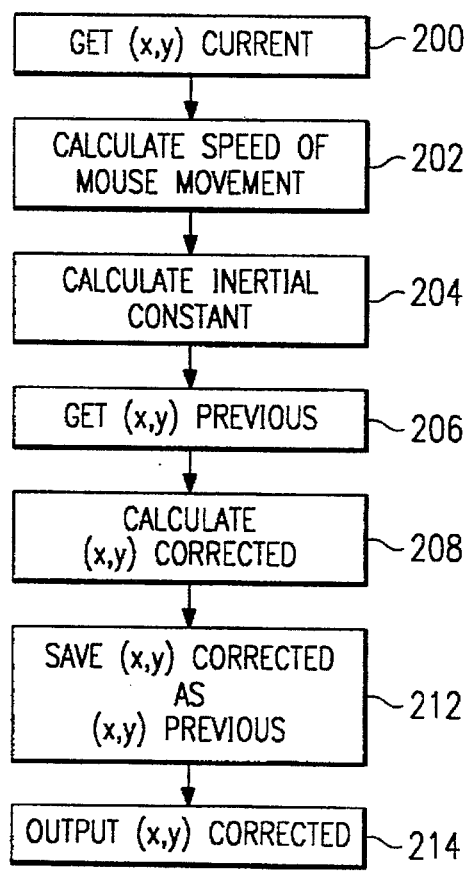
FIG. 2 is a flowchart of the operation of the digital filter of the present invention.

FIG. 2 is a flowchart of exemplary logic for implementing the digital filter 22 of the present invention. It will be recognized that execution of the filter shown in FIG. 2 is initiated responsive to movement of the mouse 18. In step 200, the coordinates of the current position of the mouse pointer 24, i.e., $(x,y)_{current}$, are obtained. In step 202, the speed of mouse movement s is determined. It will be recognized that, while the value of s may be calculated exactly by applying the following equation:

$$s = (\Delta x^2 + \Delta y^2)^{1/2}/\Delta t. \quad (4)$$

An approximation of the value of s using the following equation is sufficient:

$$s = (\Delta x + \Delta y)/\Delta t. \quad (5)$$

If one can fairly assume that the mouse movement occurs in a constant time interval, then a proportional value:

$$s = \Delta x + \Delta y \quad (6)$$

can be used to further simplify the task of calculating the speed. In any event, once s is calculated in step 202, in step 204, the inertial constant is obtained. In particular, if the inertial constant $\alpha$ is being applied, the value thereof as set by the user is merely accessed, whereas if the speed-sensitive inertial constant $\beta$ is being applied, the value thereof must be calculated using equation (2) set forth above. Additionally, it will be recognized that if the filter is being implemented using the mathematical model set forth in equation (1) above, the value of s need not be calculated and step 202 may be eliminated altogether. In any event, once $\alpha$ or $\beta$ has been determined, the coordinates for the previous mouse pointer 24 position, i.e., $(x,y)_{previous}$, are obtained in step 206. In step 208, the coordinates for the corrected mouse pointer location, i.e., $(x,y)_{corrected}$ are calculated using equation (1) or (3) above. In step 212, the coordinates $(x,y)_{corrected}$ are saved as $(x,y)_{previous}$ for use in computing the next set of corrected coordinates. Finally, in step 214, the coordinates $(x,y)_{corrected}$ are output.

Figure 3:
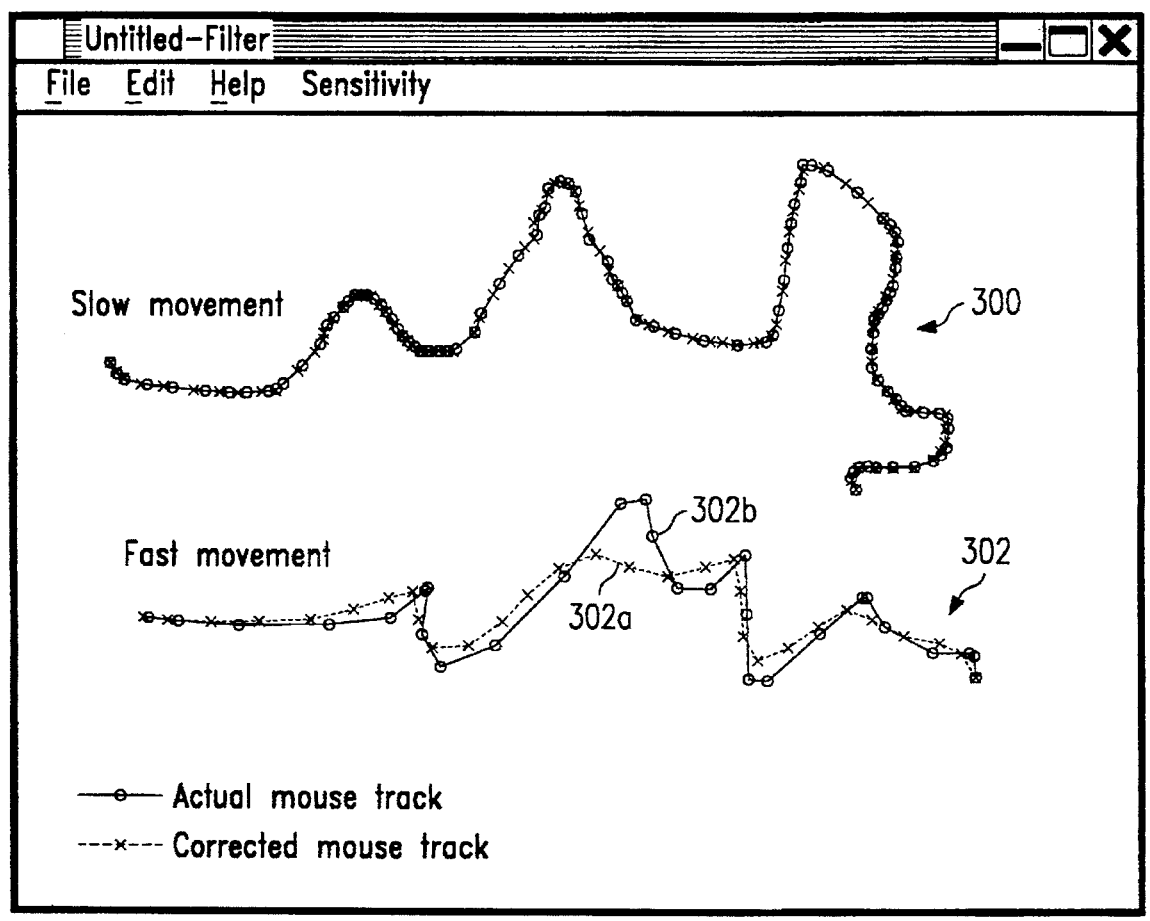
FIG. 3 illustrates the speed sensitivity of one embodiment of the digital filter of the present invention.

FIG. 3 illustrates the speed sensitivity feature of the alternative embodiment of the digital filter 22 of the present invention, as embodied by the mathematical model set forth in equation (3) above. Referring to FIG. 3, pair of lines 300 illustrates the actual mouse movement versus the corrected, or filtered, pointer movement when the mouse 18 (FIG. 1) is moved slowly. As indicated above, because when a user moves the mouse 18 slowly, he typically wants the path of the mouse pointer 24 (FIG. 1) across the display 20 (FIG. 1) to correspond exactly to the path of the mouse 18, the pair of lines are practically identical. In contrast, a pair of lines 302 illustrate the actual mouse movement versus the filtered pointer 24 movement when the mouse 18 is being moved quickly. Again, as indicated above, because when a user moves the mouse 18 quickly, he is not as concerned that the path of the pointer 24 exactly follow that of the mouse 18, there are differences in the lines 302. In particular, a line 302a representing the filtered pointer 24 movement is much smoother than a line 302b representing the actual path of the mouse 18. For both pairs of lines 300, 302, the distance between points on the lines 300, 302, is proportional to the speed of mouse movement.

It is understood that the present invention can take many forms and embodiments, the embodiments shown herein are intended to illustrate rather than limit, the invention, it being understood that variations may be made without departing from the spirit of the example of the invention. For example, the digital filter 22 of the present invention could be used for any number of different types of input devices, such as a joystick, trackball or stylus, in connection with which the manual dexterity of the user may have an effect on the use of the device.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. In a computer comprising an input device for manipulating presentation of a pointer on a display, a computer program stored on a computer-readable medium for smoothing the movement of the pointer as presented on the display, the computer program comprising:

instructions for determining current device coordinates identifying a location on said display as indicated by a position of said input device;

instructions for determining previous device coordinates identifying a previous location of said pointer on said display;

instructions for determining a value of an inertial constant;

instructions for calculating corrected device coordinates using said current device coordinates, said previous device coordinates and said inertial constant; and instructions for displaying said pointer on said display at a location identified by said corrected device coordinates;

wherein said value of said inertial constant is dependent upon a value of a constant indicative of a desired amount of speed sensitivity, the speed of movement of said input device, and a value of a constant indicative of a desired amount of filtering.

2. The computer program of claim 1 further comprising instructions for saving said corrected device coordinates as said previous device coordinates.

3. The computer program of claim 1 wherein said value of said constant indicative of a desired amount of speed sensitivity and said value of said constant indicative of a desired amount of filtering are user-selectable.

4. The computer program of claim 1 wherein said inertial constant is a speed sensitive inertial constant $\beta$ calculated using the following equation:

$$\beta = \alpha(1 - e^{-cs})$$

wherein c represents said constant indicative of a desired amount of speed sensitivity, s represents the speed of movement of said input device, and $\alpha$ represents said constant indicative of a desired amount of filtering.

5. The computer program of claim 4 wherein said corrected device coordinates are calculated using the following equation:

$$(x,y)_{corrected} = (1-\beta)(x,y)_{current} + \beta(x,y)_{previous}$$

where $(x,y)_{corrected}$ represents said corrected device coordinates, $(x,y)_{current}$ represents said current device coordinates, and $(x,y)_{previous}$ represents said previous corrected device coordinates.

6. The computer program of claim 1 wherein said computer program is incorporated into a device driver of said computer.

7. The computer program of claim 1 wherein said computer program is incorporated into an application program of said computer.

8. The computer program of claim 1 wherein said input device is one of a mouse, joystick, trackball or stylus.

9. In a computer comprising an input device for manipulating presentation of a pointer on a display, an apparatus for implementing a self-adjusting digital filter for smoothing the movement of the pointer as presented on the display, the apparatus comprising:

means for determining current device coordinates identifying a location on said display as indicated by a position of said input device;

means for determining previous device coordinates identifying a previous location of said pointer on said display;

means for determining a value of an inertial constant;

means for calculating corrected device coordinates using said current device coordinates, said previous device coordinates and said inertial constant; and means for displaying said pointer on said display at a location identified by said corrected device coordinates;

wherein said value of said inertial constant is dependent upon a value of a constant indicative of a desired amount of speed sensitivity, the speed of movement of said input device, and a value of a constant indicative of a desired amount of filtering.

10. The apparatus of claim 9 further comprising means for saving said corrected device coordinates as said previous device coordinates.

11. The apparatus of claim 9 wherein said value of said constant indicative of a desired amount of speed sensitivity and said value of said constant indicative of a desired amount of filtering are user-selectable.

12. The apparatus of claim 9 wherein said inertial constant is a speed sensitive inertial constant $\beta$ calculated using the following equation:

$$\beta = \alpha(1 - e^{-cs})$$

wherein c represents said constant indicative of a desired amount of speed sensitivity, s represents the speed of movement of said input device, and $\alpha$ represents said constant indicative of a desired amount of filtering.

13. The apparatus of claim 12 wherein said corrected device coordinates are calculated using the following equation:

$$(x,y)_{corrected} = (1-\beta)(x,y)_{current} + \beta(x,y)_{previous}$$

where $(x,y)_{corrected}$ represents said corrected device coordinates, $(x,y)_{current}$ represents said current device coordinates, and $(x,y)_{previous}$ represents said previous corrected device coordinates.

14. The apparatus of claim 9 wherein said apparatus is incorporated into a device driver of said computer.

15. The apparatus of claim 9 wherein said apparatus is incorporated into an application program of said computer.

16. The apparatus in claim 9 wherein said input device is one of a mouse, joystick, trackball stylus.

17. In a computer comprising an input device for manipulating presentation of a pointer on a display, a method of smoothing the movement of the pointer as presented on the display, the method comprising:

determining current device coordinates identifying a location on said display as indicated by a position of said input device;

determining previous device coordinates identifying a previous location of said pointer on said display;

determining a value of an inertial constant;

calculating corrected device coordinates using said current device coordinates, said previous device coordinates and said inertial constant; and displaying said pointer on said display at a location identified by said corrected device coordinates;

wherein said value of said inertial constant is dependent upon a value of a constant indicative of a desired amount of speed sensitivity, the speed of movement of said input device, and a value of a constant indicative of a desired amount of filtering.

18. The method of claim 17 further comprising saving said corrected device coordinates as said previous coordinates.

19. The method of claim 17 wherein said value of said constant indicative of a desired amount of speed sensitivity and said value of said constant indicative of a desired amount of filtering are user-selectable.

20. The method of claim 17 wherein said inertial constant is a speed sensitive inertial constant $\beta$ calculated using the following equation:

$$\beta = \alpha(1-e^{-cs})$$

wherein c represents said constant indicative of a desired amount of speed sensitivity, s represents the speed of movement of said input device, and $\alpha$ represents said constant indicative of a desired amount of filtering.

21. The method of claim 20 wherein said corrected device coordinates are calculated using the following equation:

$$(x,y)_{corrected} = (1-\beta)(x,y)_{current} + \beta(x,y)_{previous}$$

where $(x,y)_{corrected}$ represents said corrected device coordinates, $(x,y)_{current}$ represents said current device coordinates, and $(x,y)_{previous}$ represents said previous corrected device coordinates.

22. The method of claim 17 wherein said input device is one of a mouse, joystick, trackball or stylus.

* * * * *

UNITED STATES PATENT AND TRADEMARK OFFICE
CERTIFICATE OF CORRECTION

PATENT NO. : 5,661,502
DATED : August 26, 1997
INVENTOR(S) : Xuejiang Cheng

It is certified that error appears in the above-identified patent and that said Letters Patent is hereby corrected as shown below:

Column 8,
Line 2, insert -- device -- after "previous".

Signed and Sealed this

Sixth Day of November, 2001

Attest:

NICHOLAS P. GODICI
Attesting Officer   Acting Director of the United States Patent and Trademark Office